(12) United States Patent
Perloff

(10) Patent No.: US 6,434,676 B1
(45) Date of Patent: Aug. 13, 2002

(54) FIFO WITH RANDOM RE-READ SUPPORT AND ITS APPLICATION

(75) Inventor: Ronald S. Perloff, Poway, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/468,964

(22) Filed: Dec. 21, 1999

(51) Int. Cl.[7] .............................................. G06F 12/00
(52) U.S. Cl. ...................... 711/154; 711/104; 710/52
(58) Field of Search ............................... 711/154, 104; 710/52, 54, 56, 57, 53, 55

(56) References Cited

U.S. PATENT DOCUMENTS

| | | | | |
|---|---|---|---|---|
| 4,447,873 A | * | 5/1984 | Price et al. .................... | 710/53 |
| 5,074,420 A | * | 12/1991 | Cappel, III ............... | 211/181.1 |
| 5,666,494 A | * | 9/1997 | Mote, Jr. ...................... | 710/57 |
| 5,687,316 A | * | 11/1997 | Graziano et al. ........... | 709/212 |
| 5,708,779 A | * | 1/1998 | Graziano et al. ........ | 395/200.8 |
| 5,758,075 A | * | 5/1998 | Graziano et al. ........... | 370/463 |
| 5,784,649 A | * | 7/1998 | Holm ......................... | 370/465 |
| 5,809,557 A | * | 9/1998 | Shelma et al. .............. | 365/193 |
| 6,055,616 A | * | 4/2000 | Panwar ........................ | 710/52 |
| 6,115,387 A | * | 9/2000 | Egbert et al. ................ | 370/423 |
| 6,301,264 B1 | * | 10/2001 | Holm ......................... | 341/103 |
| 6,304,924 B1 | * | 10/2001 | Varma ......................... | 710/52 |
| 6,330,626 B1 | * | 12/2001 | Dennin et al. .............. | 709/108 |

OTHER PUBLICATIONS

Hobson et al., "A Parallel Embedded–Processor Architecture for ATM Reassembly," IEEE, pp. 23–37, Feb. 1999.*

* cited by examiner

*Primary Examiner*—Matthew Kim
*Assistant Examiner*—Stephen Elmore
(74) *Attorney, Agent, or Firm*—Blakely, Sokoloff, Taylor & Zafman LLP

(57) ABSTRACT

A FIFO storage structure is provided with a RAM array including a number of memory locations, and control circuitry coupled to the RAM array. The control circuitry facilitates sequential write and read accesses of the memory locations, as well as non-sequential re-read of previously read memory locations. The control circuitry includes in particular circuit elements for facilitating variably deferred release and reclaiming of sequentially read in-use ones of the memory locations, thereby allowing the non-sequential re-reads to be performed in addition to the fundamentally sequential writes and reads. In each of a number of applications, a look up engine is provided with the enhanced FIFO. In one particular application, a forwarding section of a networking device is provided with such look up engine.

23 Claims, 7 Drawing Sheets

FIFO WITH RANDOM RE-READ SUPPORT AND ITS APPLICATION

BACKGROUND OF THE INVENTION

1. Field of the Invention

The present invention relates to the field of data processing and data communication. More specifically, the present invention relates to the design of storage structures used in data processing and data communication devices.

2. Background Information

FIG. 1 illustrates a prior art storage structure equipped to support random read and write of its storage locations. Storage structure 50 includes memory array 52 having a number of memory locations, write enable control signal pin 54, address input pins 56a–56b, and data in and out pins 58a–58b. By setting write enable control signal 54 to denote a "write" operation, and applying the appropriate address information to address input pins 56a, write data applied to data in pins 58a may be written into any memory location of memory array 52. Similarly, by applying the appropriate address information to address input pins 56b, previously written data stored in any memory location of memory array 52 may be retrieved and made available at data out pins 58b. While storage structure is designed to facilitate random read/write, of course a host process may elect to write to and read from its storage locations sequentially, by shouldering the responsibility of ensuring that all successive write/read addresses issued are sequential in nature. [The term host process, as used herein in this application, in intended to include hardware and/or software.]

FIG. 2 illustrates a prior art first in, first out storage structure (FIFO) designed to support sequential write and read, without requiring a host process to shoulder the responsibility of ensuring the successive write/read addresses issued are sequential in nature. Storage structure 60 includes dual port memory array 62 having a number of memory locations, write counter 64, read counter 66 and full/empty logic 68, coupled to each other as shown. Write data may be sequentially written into memory locations of memory array 62 by applying a write signal to increment write counter 64, whose output is applied to the write address inputs of memory array 62. Likewise, read data may be sequentially read from memory locations of memory array 62 by applying a read signal to increment read counter 66, whose output is applied to the read address inputs of memory array 62. A host process need not be concerned with maintaining the sequential nature of the write/read addresses. By monitoring the output of write and read counters 64 and 66, full/empty logic 68 is able to set a "full" control signal to "true" to inform a host process that RAM array 62 is full (accordingly, should not be further written into) and set an "empty" control signal to "false" to inform the host process that RAM array 62 is non-empty (accordingly, should be read to process the written data).

In a number of applications, while the basic write and read operations are fundamentally sequential in nature, nevertheless it may be desirable to be able to perform random re-reads in addition to the fundamental sequential write/read operations. An example of such applications is one where data are sequentially queued, and multiple sets of the queued data are to be sequentially examined and processed concurrently in a pipelined multi-stage fashion. To facilitate the multi-set pipelined multi-stage fashion of processing, earlier queued data must be "popped off" to make the later queued data visible, and yet all "popped off" data must remain available until all stages of processing are completed. One obvious approach, if a storage structure similar to the one illustrated in FIG. 2 is continued to be used, is to provide additional hardware to store the "popped off" data, making the stored data available until all processing is completed. Another approach is to revert to the use of a storage structure similar to the one illustrated by FIG. 1. Under such approach, the "popped off" data will still be re-accessible, until they are discarded. However, as alluded to earlier, the burden of maintaining the sequential nature of the fundamental writes and reads will be reverted back to the host process. Neither approach is desirable.

A specific application where such situations occur is in networking switch and router applications. Network switches/routers receive continuous streams of packets, and the included IP or MAC addresses are queued and examined to determine where the packets should be switched or routed. The determination typically involves data look ups. For performance reasons, it is desirable to be able to perform the look up for multiples of these IP/MAC addresses concurrently in a pipelined multi-stage fashion. However, as alluded to earlier, it is desirable if the concurrent processing can be made possible without having to resort to the use of RAM or registers to "queue" up the IP/MAC addresses (and shifting the burden of maintaining the sequential nature of the fundamental writes and reads to the host process) nor having to pay the price of replicating the hardware required to carry the "context" information of each IP/MAC address being concurrently processed.

Thus, a novel storage structure that can better accommodate this type of processing is desired.

SUMMARY OF THE INVENTION

The present invention includes a novel FIFO storage structure. The FIFO storage structure is provided with a RAM array including a number of memory locations, and control circuitry coupled to the RAM array. The control circuitry facilitates sequential write and read accesses of the memory locations, as well as non-sequential re-read of memory locations previously read in sequence. In particular, the control circuitry includes circuit elements for facilitating variably deferred release and reclaiming of sequentially read in-use ones of the memory locations.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention. Furthermore, repeated usage of the phrase "in one embodiment" does not necessarily refer to the same embodiment, although it may.

Figure 1:
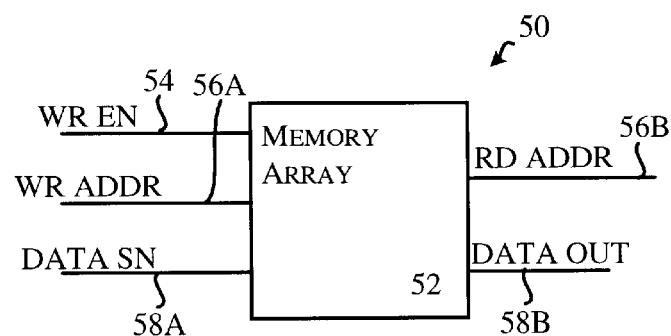
FIG. 1 illustrates a prior art random access memory.
Figure 2:
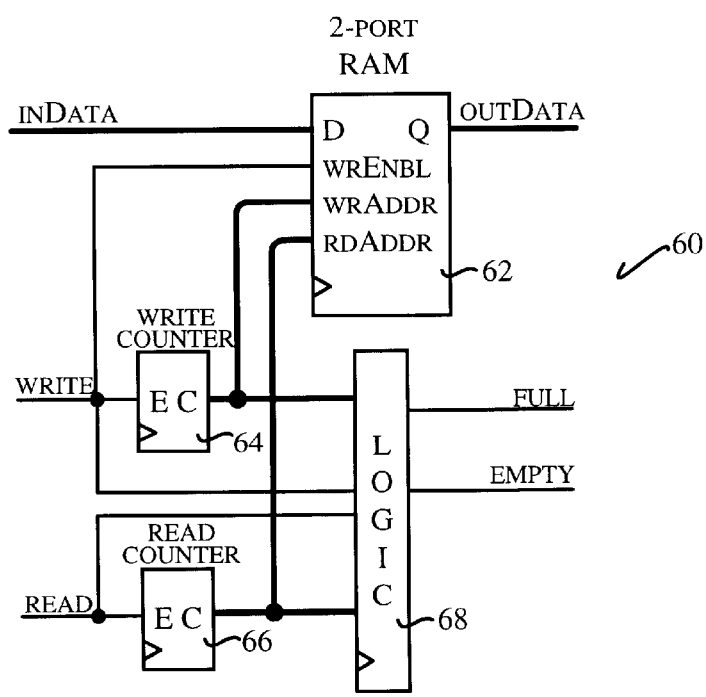
FIG. 2 illustrates a prior art FIFO storage structure.
Figure 3:
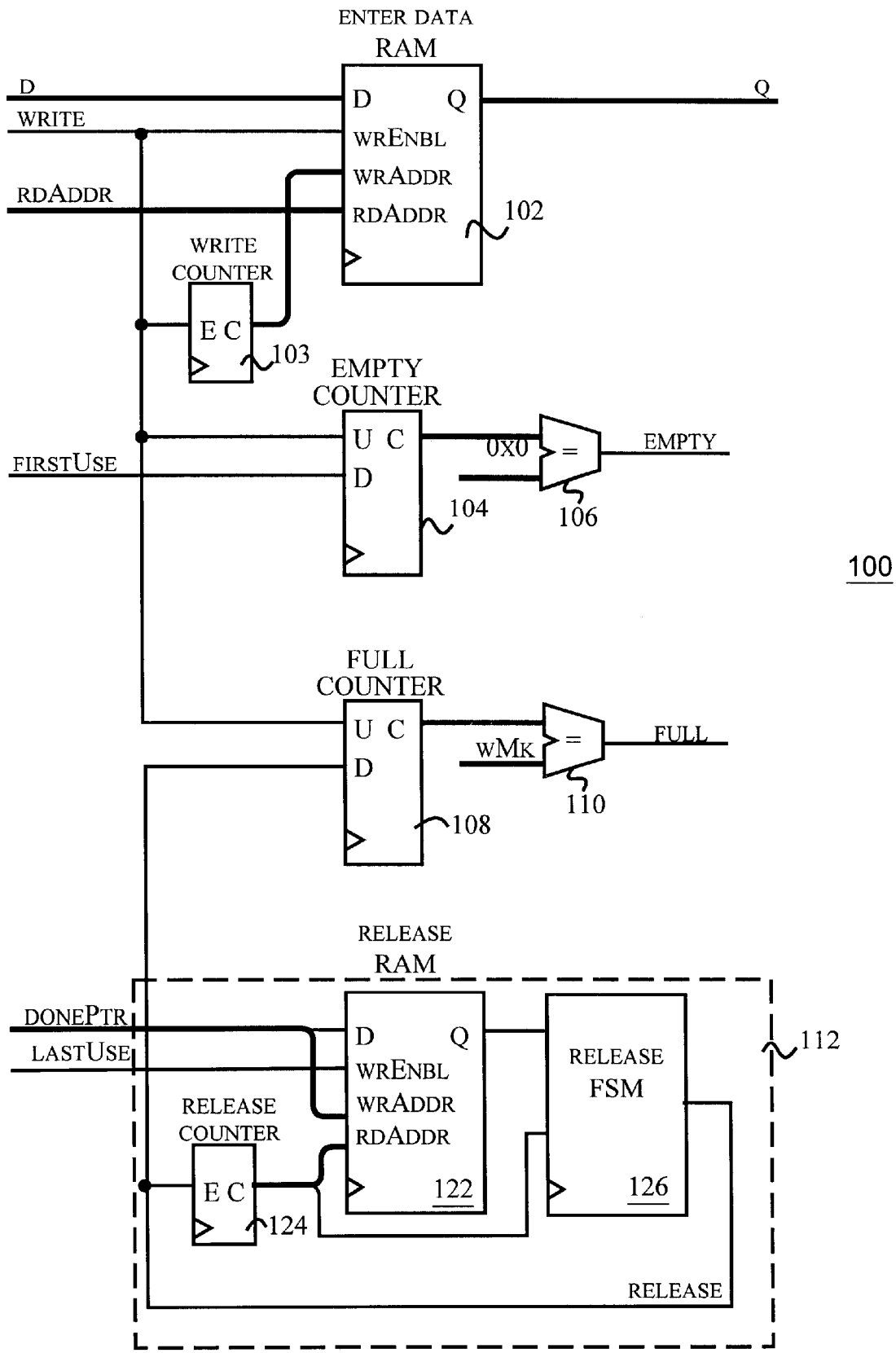
FIG. 3 illustrates the FIFO storage structure of the present invention, equipped to support random re-read of memory locations previously read in sequence, in accordance with one embodiment.

Referring now to FIG. 3, wherein a FIFO storage structure of the present invention, in accordance with one embodiment is shown. As will be readily apparent from the description to follow, while FIFO 100 is fundamentally designed to facilitate sequential write and read operations, FIFO 100 is advantageously equipped to also support random re-read of memory locations previously read in sequence. FIFO 100 advantageously permits a host process to variably defer releasing a sequentially read memory location. As a result, each sequentially read memory location may be re-read by the host process for as long as necessary. FIFO 100 will attend to the orderly "reclaiming" of the memory locations for re-use to support the fundamental sequential writes and reads.

The term "reclaim" is used for ease of understanding. FIFO 100 need not perform any marking and the like to explicitly "reclaim" a storage location (although it may in alternate embodiments). Rather "reclaiming" of memory locations is effectuated indirectly by FIFO 100 taking action that contributes to the host processor in forming the understanding that it is appropriate for the host process to continue its sequential writes. A released memory location is literally reclaimed when the host process writes into it again (for a new use).

As illustrated, FIFO 100 includes memory array 102 having a number of memory locations, write counter 103, empty counter 104, comparator 106, full counter 108, comparator 110, and release/reclaim control circuitry 112, coupled to each other as shown. Memory array 102 performs its conventional function of storing the application data being accumulated, staged or queued for processing (e.g. the IP or MAC addresses referred to earlier in a networking switch/router application). Write counter 103 responds to a write signal provided by the host process by generating a next write address for memory array 102 to facilitate sequential writing into memory array 102 by the host process. Unlike prior art FIFOs, FIFO 100 does not include a read counter to likewise generate a next read address for memory array 102 to facilitate sequential reading of memory array 102 by host process. Instead, the host process is free to apply a read address to perform a sequential read or a random re-read of a memory location previously read in sequence. Thus, host process has the responsibility of issuing the appropriate read addresses in sequence to effectuate the sequential read, as well as maintaining these previously issued sequential read addresses to selectively re-issue them for the random re-reads. In one embodiment, to complement the manner in which release/reclaim control circuitry 112 operates, the host process is expected to maintain a read address counter that is 1-bit wider than it is necessary to address all the memory locations of memory array 102. The lower order bits are used to form the read addresses, while the most significant bit (MSB) is employed as a control bit for facilitating release and "reclaiming" of an in-use memory location of memory array 102, to be explained more fully below.

Empty counter 104 in conjunction with comparator 106 is used to generate the "empty" control signal to inform the host process that memory array 102 is non-empty, and therefore, may be read to retrieve previously written data for processing. Unlike prior art FIFOs, empty counter 104 is not decremented responsive to a "read" signal provided by the host process (as none is provided). Instead, empty counter 104 is decremented responsive to a new "first use" control signal, which is to be provided by the host process to accompany a read address, whenever the read address is provided for the purpose of performing a sequential read. The "first use" control signal is not to be provided in conjunction with a read address, if the read address is provided for the purpose of performing a re-read. Accordingly, empty counter 104 is decremented for the right type of read only (i.e. sequential read), and not for re-reads.

Full counter 108 in conjunction with comparator 110 is used to generate the "full" control signal for the host process to inform the host process that memory array 102 is full, and therefore should not be further written into. Similarly, unlike prior art FIFOs, full counter 108 is not decremented responsive to a "read" signal provided by the host process (as none is provided). Instead, full counter 108 is decremented responsive to a new "release/reclaim" control signal generated by release/reclaim control circuitry 112, to be described more fully below. For the illustrated embodiment, the "full" control signal is generated whenever the number of memory locations of memory array 102 in use reaches a predetermined watermark (wMK). [Note that under the present invention, the number of memory locations of memory array 102 in use, unlike prior art FIFOs, is not synonymous with the number of written data remaining to be read. Under the present invention, some or all of the in-use memory locations may have been sequentially read already, but they are still considered as "in-use", until the host process releases them (presumably after all necessary re-reads have been performed).]

In general, release/reclaim control circuitry 112 facilitates the host process in releasing the sequential read memory locations after all necessary re-reads have been performed. The host process may release these sequentially read memory locations in any order (i.e. sequentially or non-sequentially). However, release/reclaim control circuitry 112 does not generate the release/reclaim signal to indirectly "reclaim" each released memory location immediately. Release/reclaim control circuitry 112 examines and considers the memory locations for "reclaim" in sequence. A release/reclaim control signal is generated in due course for each released memory location to indirectly "reclaim" the memory location, when they are up for consideration in sequence.

Still referring to FIG. 3, for the illustrated embodiment, release/reclaim control circuitry 112 includes memory array 122, release counter 124 and finite state machine (FSM) 126. Memory array 122 has the same number of memory locations as memory array 102. Memory array 122 is used to store a control bit for the corresponding memory location of memory array 102 to allow FSM 126 to determine if the corresponding memory location has been released by the host process, when the corresponding memory location is up for "reclaim" consideration. A memory location is up for "reclaim" consideration, when the corresponding memory location in memory array 102 is pointed to by release counter 124. The content of release counter 124 is used to generate the read address for memory array 122 to cause memory array 122 to output the stored control bit for the corresponding memory location under consideration for FSM 126. FSM 126 increments release counter 124 whenever it "reclaims" a memory location, advancing release counter 124 to point to the next sequential memory location to be considered for "reclaiming", thereby effectuating the sequential order of consideration.

For the illustrated embodiment, FSM 126 "reclaims" a memory location if it determines that the stored control bit for the memory location has a predetermined relationship to a reference bit; more specifically, if the stored control bit is opposite to the reference bit. For the illustrated embodiment, the reference bit is stored as the most significant bit of release counter 124. Thus, as FSM 126 increments release counter 124, it toggles the MSB whenever it finishes one pass of all memory locations. Thus, the host process also employs a complementary scheme to write the control bit into memory array 122 to release a memory location. Recall that in one embodiment, the host process employs a read address counter that is 1-bit larger than it is necessary to address all the memory locations of memory array 102. This extra bit is also the MSB, with the lower order bits being used as the read addresses. Thus, this MSB maintained by the host process also gets toggled as the host process increments its read address counter after each pass through all the memory locations. For the illustrated embodiment, at initialization time, release counter 124 is initialized to zero (including the MSB). Thus, the host process initializes its read address counter to zero for all bits, except for the MSB, which is initialized to "1". [In alternate embodiments, the opposite may be practiced instead.]

The host process supplies the MSB of the "expanded" address of the memory location to be released as the write data (i.e. control bit), and the lower order bits as the write address, to write the control bit into the corresponding memory location in memory array 122, when it releases a corresponding memory location of memory array 102. It also applies a "last use" signal to write enable memory array 122. As a result, the host process will always be writing a control bit having a value that is opposite to the MSB of release counter 124, when the lower order bits of release counter 124 points to the memory location as the next memory location to be considered for "reclaiming".

Accordingly, novel FIFO 100 of the present invention advantageously enables a host process to perform random re-read of memory locations previously read in sequence, in addition to what are otherwise fundamentally sequential writes and reads.

Figure 4:
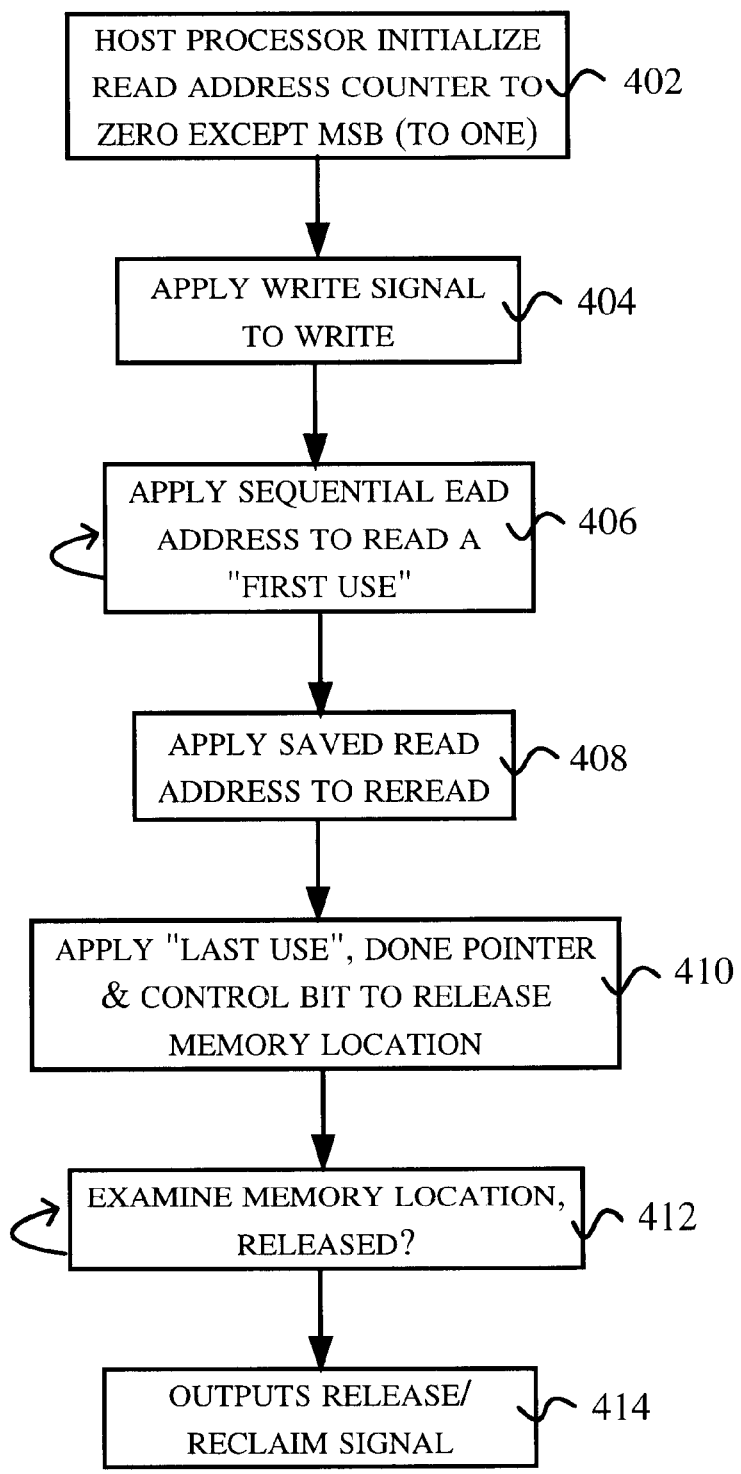
FIG. 4 illustrates a method of operating the enhanced FIFO of the present invention, in accordance with one embodiment.

Referring now to FIG. 4, wherein a method of operation of the present invention is illustrated. As described earlier, at initialization, 402, a host process initializes its "read address counter" to zero, except for the MSB, which is initialized to one; and the modified FIFO of the present invention initializes the release RAM and release counter of its release/reclaim control circuitry to zero. At 404, the host process applies a write signal to sequentially write into the "data" memory locations of the modified FIFO. At 406, the host process applies a sequential read address to sequential read from the "data" memory locations of the modified FIFO. The host process also saves the read address, as well as applying a "first use" signal to decrement the empty counter of the enhanced FIFO. At a later point in time, 408, the host process applies the saved sequential read address to re-read the data previously read in sequence from the "data" memory locations of the modified FIFO. Operation 408 is repeated as many times as necessary.

At 410, when the host process has completed its processing and is ready to release one of the in-use memory locations, the host process applies a last use signal to write enable the "control" memory array of the release/reclaim circuitry of the enhanced FIFO. At the same time, the host process applies the lower order bits of a saved sequential read address to write the MSB of the saved sequential read address into the appropriate memory location of the "control" memory array to release the corresponding memory location in the "data" memory array. At a subsequent point in time, 412, the release/reclaim control circuitry examines the saved control bit to determine if the corresponding memory location in the "data" memory array has been released by the host process. If the corresponding memory location has not been released, 412 is repeated. 412 is repeated until the corresponding memory location is determined to be released by the host process. At such time, 414, the release/reclaim control circuitry outputs a release/reclaim signal to decrement the full counter of the enhanced FIFO. Furthermore, the release/reclaim control circuitry increments the release counter to point to the next memory location to be examined.

Operation 404–414 are repeated as long as there are data to be queued, and "popped off" for processing in a pipelined multi-stage manner that requires repeated "re-read" of the "popped off" data until all processing are completed.

Figure 5:
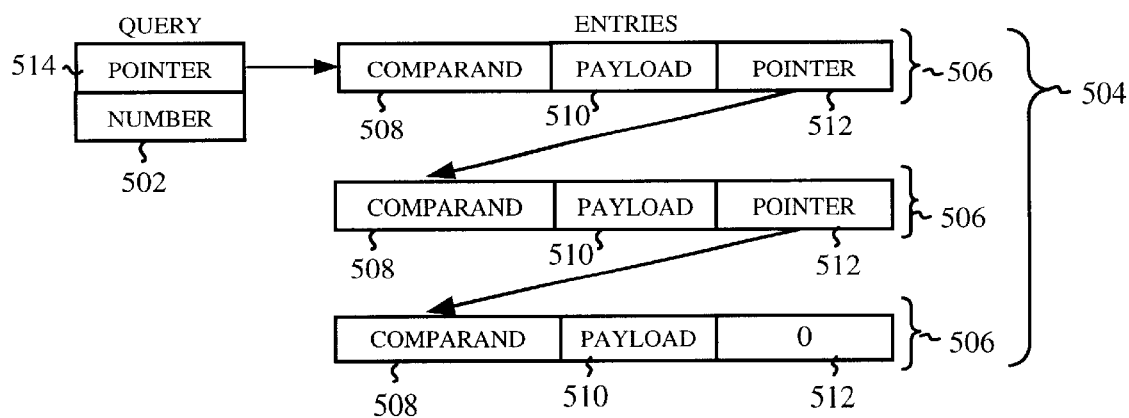
FIG. 5 illustrates an example look up application that can benefit from using the enhanced FIFO of the present invention to implement multiple concurrent look ups.

Referring now to FIG. 5, wherein a block diagram illustrating an example look up that can benefit from using the enhanced FIFO of the present invention to implement multiple concurrent look ups. The example look up is of a kind that looks for matches between a presented query number 502 and a set of threaded entries 504. Each entry 506 consists of comparand 508, payload 510 and pointer 512. Each pointer 512 points to the location of the next entry, except for the last entry 506, whose "pointer" 512 is set to null. The query number 502 is mapped to an initial pointer 514 that points to the beginning of the thread. At each entry, the comparand 508 is matched against the query number 502. If they agree, the look up is successful, and the associated payload 510 is reported as the look up result. If they disagree, and the associated pointer 512 is non-zero, the look up process continues with the next entry 516. The process continues until either a match is found, or the last entry 506 is encountered, where the associated pointer is null (or zero). In such case, the look up process reports failure.

Typically, the query number 502 is read from a FIFO. If the look up process is to process only one query at time, the query number 502 remains available at the output of the FIFO, and is removed only when the query is completed, and the FIFO is "popped" to give access to the next query. In practical implementations, the threaded lists are typically stored in RAM that takes several clock cycles to access the entries. Thus, overall system performance can be improved if look up process can be performed for multiple of these queries at the same time.

Figure 6:
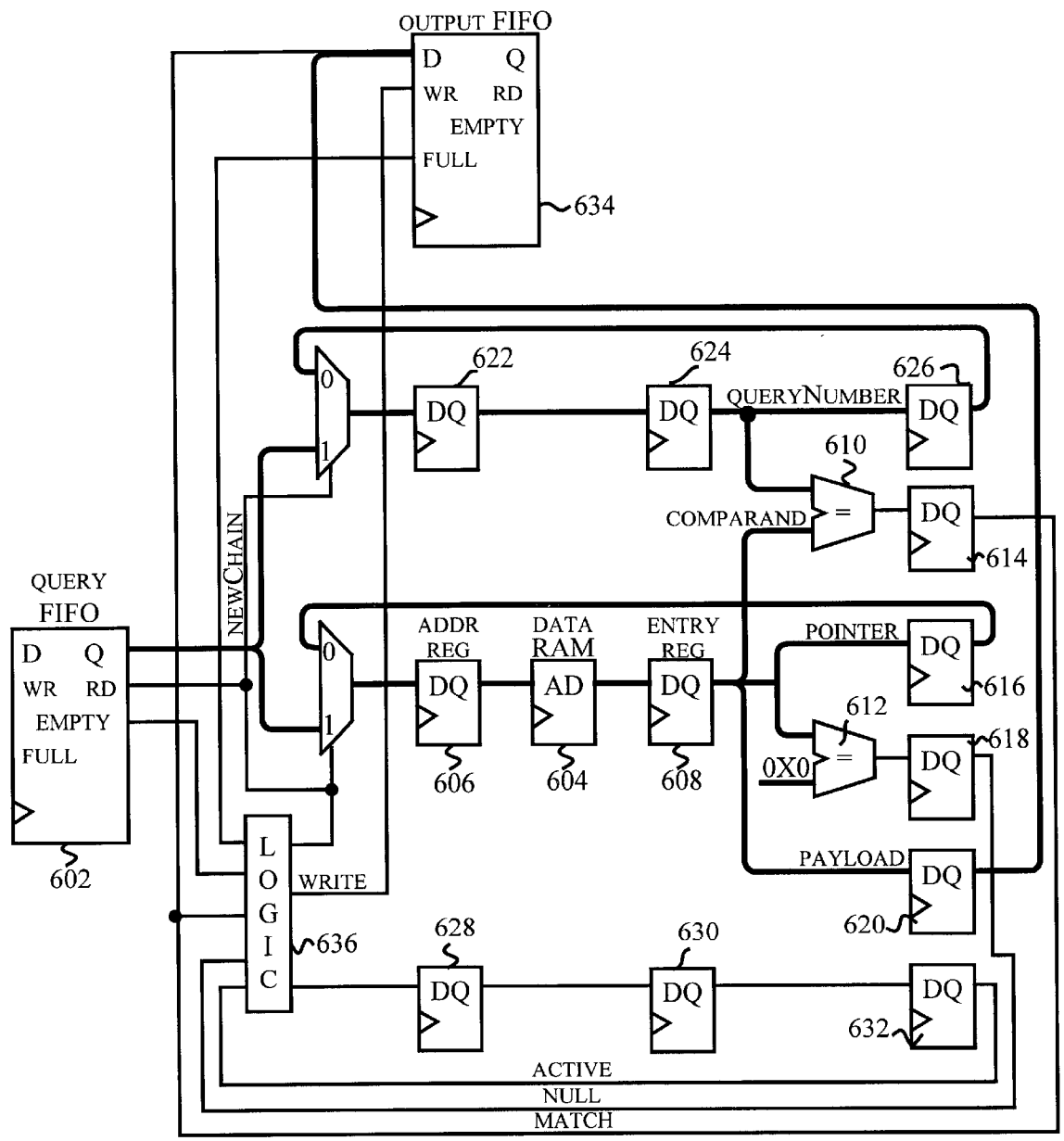
FIG. 6 illustrates an example implementation that supports up to three concurrent example look ups of FIG. 5.

FIG. 6 illustrates an example implementation that supports up to three concurrent example look ups of FIG. 5. The implementation includes a conventional FIFO 602 for storing the presented query numbers, and data RAM 604 to store the threaded lists. The implementation further includes address register 606 to store an address for accessing an entry of a threaded list, and entry register 608 to store a retrieved entry. Comparators 610 and 612 are used to determine if the comparand of an entry matches a presented query number and whether the pointer of an entry is null. Registers 614–620 are used to store the result of the comparison with the "current" retrieved entry, the "next" pointer of the "current" retrieved entry, the results of the comparison on whether the "next" pointer of the "current" retrieved entry is null or not, and the payload of the "current" retrieved entry. Registers 622–626 and registers 628–632 are used to store three presented query numbers "popped off" FIFO 602, and their associated "control information". Together, each of the corresponding register pair, 622 and 628, 624 and 630, 626 and 632, constitutes the "context" of the corresponding query, and it is circulated until the look up process for the query is determined to be successful or failed. Output FIFO 634 stores the result of the look up, whereas logic block 636 controls the overall operation of the implementation. [For ease of understanding, the issue of out-of-order completion of the look-ups is ignored. The issue may be addressed using a number of techniques, including but not limited to the technique disclosed in co-pending U.S. patent application Ser. No. 09/468,965, entitled "Method and Apparatus For Maintaining Order In A Pipelined Process and Its Applications", having common inventorship with the present application, and contemporaneously filed.]

Upon initialization, which includes resetting activity registers 628–632, logic block 636 waits for the combination of a "false" query FIFO empty line, indicating FIFO 602 holds a new query, AND a "false" full line from output FIFO 634, indicating there is room in output FIFO 634 to store the look up result, AND EITHER a "false" activity bit, indicating there is no activity in the "current" time slot, OR an asserted match signal OR an asserted null signal, either of which indicates the end of an earlier query. When these conditions are met, logic block 636 asserts the "newChain" signal, which causes the following events to occur at the next clock cycle:

1) address register 606 uses the query pointer as the next RAM address;
2) register 622 copies the query number, and
3) activity register 628 is set TRUE.

[Note that the "full" line of output FIFO 634 is actually set to a threshold equals to the capacity of output FIFO 634 minus the number of pipeline stages, which equals three in this example.]

In a subsequent clock cycle, logic block 636 makes a new, independent decision about whether it can accept the next query. Meanwhile, the RAM data resulting from the query initiated above are copied into entry register 608, and the second set of "context" registers copy the data from the first set of "context" registers to stay aligned with the data.

In the next clock cycle, the following takes place:
1) the result of the comparison of the query number to the comparand of the retrieved entry is stored into register 614;
2) the result of comparing the forward pointer to zero is stored into register 618;
3) pointer register 616 copies the forward pointer of the retrieved entry in case the list must be searched further;
4) payload register 620 copies the payload from the retrieved entry in case the match was successful; and
5) the "context" registers are successively copied.

On the next clock, the contexts and the results of the current entry are available to logic block 636. If activity is "true", AND EITHER match OR null are "true", logic block 636 asserts the write line so that the look up results are written into output FIFO 634 at the indicated location.

[Note that since the look up results may be completed out of order for the "popped off" query numbers, it is assumed some mechanism to ensure their orderly placement or retirement is employed. One such technique is the subject of U.S. patent application Ser. No. 09/468,965, entitled "Method and Apparatus for Maintaining Order in a Pipelined Process and Its Application", having common inventorship with the present application, and contemporaneously filed. Other known techniques may also be employed instead.]

If the above conditions for ending a query are not met, then logic block 636 drives the "newChain" signal "false". In that case, on the next clock,
1) address register 606 would copy the fed back pointer to use as the next RAM address,
2) query number register 622 would copy the fed back query number, and
3) activity register 628 would copy the fed back activity value.

In applications where each query number can be a very large binary number (such as networking applications where the query numbers are lengthy IP or MAC addresses), it can be seen from the above example implementation, if a significant number of look ups are to be performed concurrently, a substantial cost of hardware to capture and circulate the "context" information would have to be incurred.

Figure 7:
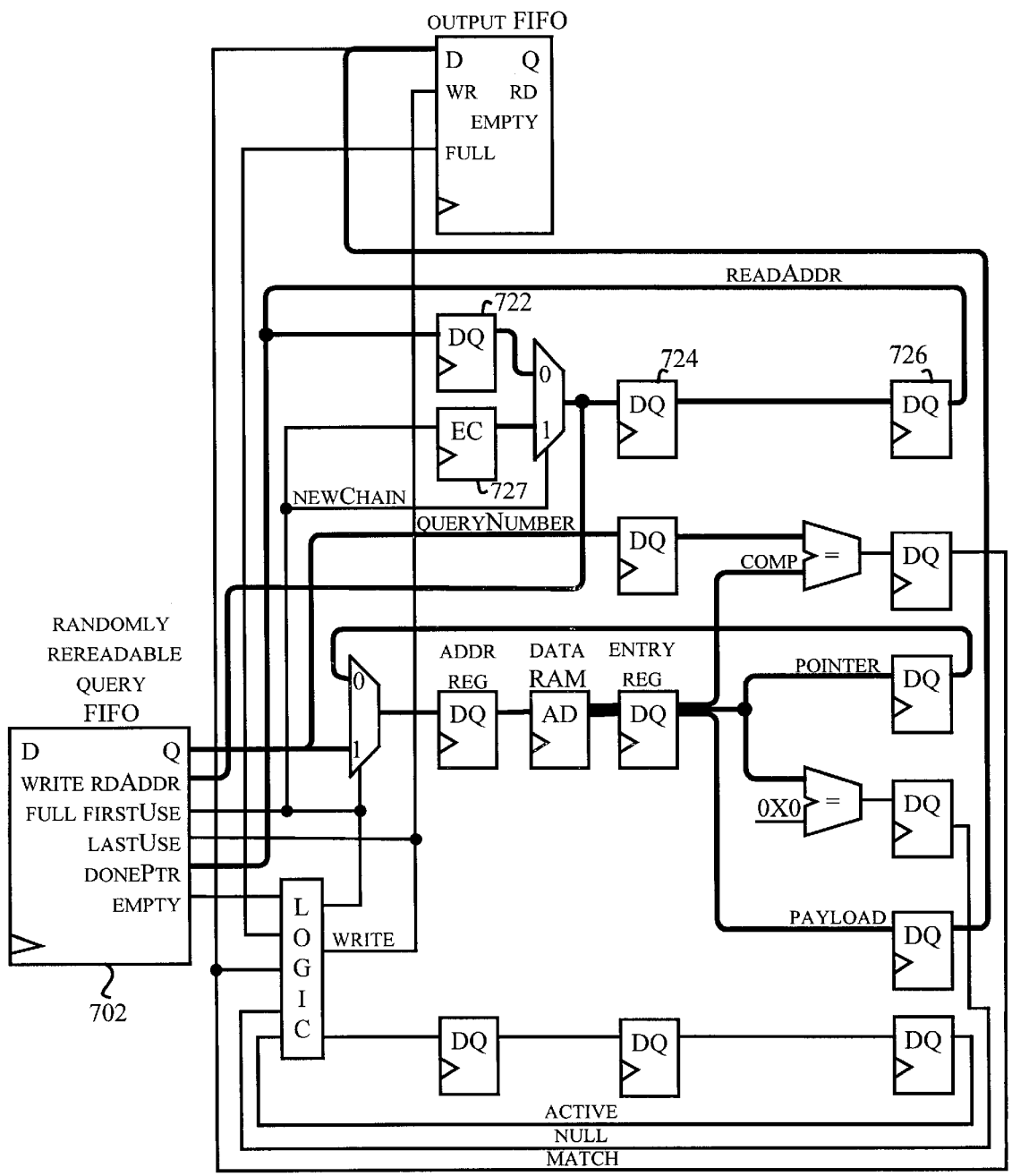
FIG. 7 illustrates an example implementation, using the enhanced FIFO of the present invention to support up to three concurrent example look ups of FIG. 5.

FIG. 7 illustrates an example implementation, using the enhanced FIFO of the present invention to support multiple concurrent example look ups of FIG. 5. In this example implementation, query FIFO 602 has been replaced by query FIFO 702 incorporated with the teachings of the present invention, i.e. the ability to re-read memory locations previously read in sequence, and registers 622–626 have been replaced with register 722–726 and counter 727. Register 722∫726 in conjunction with counter 727 implement the earlier described read address structure of the host process and the mechanism for memorizing issued sequential addresses to facilitate re-read as well as eventual release of the unneeded "data" memory locations in FIFO 702. [Note that "address" registers 722–726 are substantially smaller than "query number" registers 622–626. Similarly, for ease of understanding, the issue of out-of-order completion of the look-ups is ignored. As alluded to earlier, the issue may be addressed using a number of techniques, including but not limited to the technique disclosed in aforementioned co-pending U.S. patent application Ser. No. 09/468,965.

Operationally, instead of "popping" query FIFO 702, the "newChain" signal is applied as the "first use" signal to decrement the empty counter of FIFO 702 as described earlier. Furthermore, the "newChain" signal also increments read address counter 727 so that a subsequent read will reference the next sequential location in FIFO 702. The "newChain" signal, instead of controlling a query number selection multiplexor, it now controls a read address selection multiplexor, selecting whether a "new" read address is used for sequential read, or an "old" read address is re-used for re-read. An "old" read address ultimately is also applied to FIFO 702 as the done pointer as described earlier. In addition to enabling a write to output FIFO 724, the write signal is also applied to FIFO 702 as the last use signal, as described earlier, to assist the writing of the control bit to release an unneeded location in FIFO 702. Otherwise, the implementation operates substantially as described for the prior art implementation of FIG. 6.

Thus, it can be seen this implementation employing the enhanced FIFO of the present invention with random re-read support, significantly reduces the hardware requirement of the look up engine, and allows more look ups to be pipelined at the same time.

Figure 8:
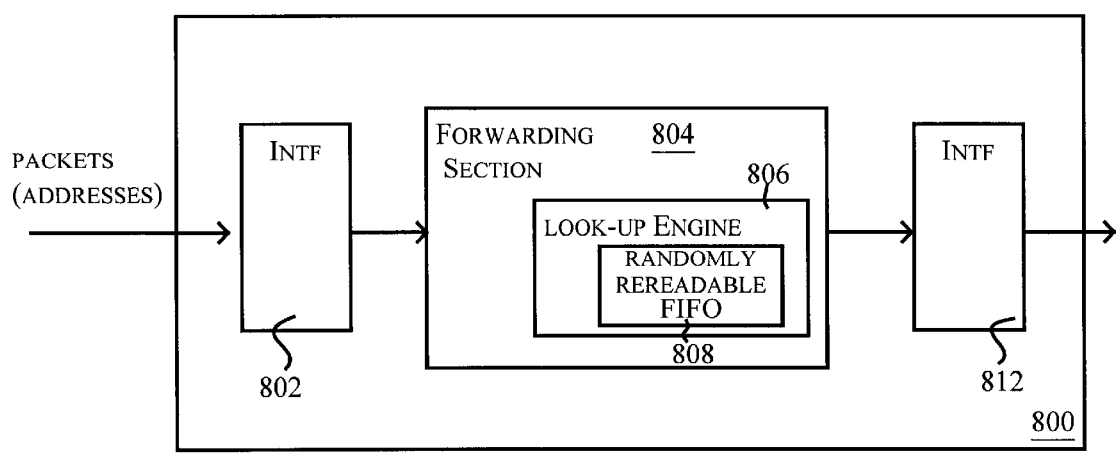
FIG. 8 illustrates an example application of the look up engine of FIG. 7.

Referring now to FIG. 8, wherein an example application of the enhanced look up engine of FIG. 7 is shown. As illustrated, networking device 800 includes first and second I/O interfaces 802 and 812 and forwarding section 804. Forwarding section 804 includes look up engine 806 for looking up data associated with addresses, such as IP or MAC addresses. Look up engine 806 is provided with FIFO 808 incorporated with the teachings of the present invention (as earlier described, referencing FIG. 7). Except for FIFO 808, networking device 800 is intended to represent a broad range of networking devices known in the art, including but not limited to routers and switches.

Accordingly, a novel FIFO equipped to support random re-read, and its application (in particular, to networking applications) have been described.

EPILOGUE

From the foregoing description, those skilled in the art will recognize that many other variations of the present invention are possible. Thus, the present invention is not limited by the details described, instead, the present invention can be practiced with modifications and alterations within the spirit and scope of the appended claims.

What is claimed is:

1. A first in, first out storage structure (FIFO) comprising:
a first random access memory (RAM) array having a first plurality of memory locations; and
first control circuitry coupled to the first RAM array to facilitate sequential write and read accesses of said first memory locations, as well as non-sequential re-read of said first memory locations, including first circuit elements for facilitating variably deferred release and reclaiming of sequentially read in-use ones of said first memory locations.

2. The FIFO of claim 1, wherein said first circuit elements comprise:
a second RAM array having a second plurality of memory locations to correspondingly store a first plurality of control bits associated with said first memory locations of said first RAM array; and
second control circuitry coupled to the second RAM array to facilitate sequential release/reclaim determination of said first memory locations, based at least in part on corresponding ones of said first control bits.

3. The FIFO of claim 2, wherein said second control circuitry comprises:
a release/reclaim counter coupled to the second RAM array to sequentially generate read addresses for said second RAM array to cause said second RAM array to sequentially output the first control bits of said first memory locations; and
release/reclaim control logic coupled to the second RAM array to conditionally generate a release/reclaim signal for each of said first memory locations in sequence, correspondingly denoting release/reclaim of each of said first memory locations, based at least in part on the corresponding ones of said first control bits.

4. The FIFO of claim 3, wherein
said release/reclaim counter comprises at least n bits, where the n lower order bits are output as said read addresses of said second RAM array; and
said release/reclaim control logic increments said release/reclaim counter whenever it generates a release/reclaim signal denoting release/reclaim of a current one of said first memory locations.

5. The FIFO of claim 4, wherein
said release/reclaim counter is n+1 bit in size, where the most significant bit is output as a reference bit; and
said release/reclaim control logic further generates said release/reclaim signal for a current one of said first memory locations based on said reference bit.

6. The FIFO of claim 5, wherein said release/reclaim control logic generates said release/reclaim signal for a current one of said first memory locations if a corresponding one of said first control bits and said reference bit has a predetermined relationship to each other.

7. The FIFO of claim 6, wherein said release/reclaim control logic generates said release/reclaim signal for a current one of said first memory locations if a corresponding one of said first control bits and said reference bit is opposite to each other.

8. The FIFO of claim 3, wherein said release/reclaim control logic comprises a finite state machine.

9. The FIFO of claim 3, wherein said FIFO further comprises a FIFO full counter to be incremented whenever said first RAM array is written into, and decremented whenever a release/reclaim signal is generated by said release/reclaim control logic.

10. In a first in, first out storage structure (FIFO), a method comprising:
incrementing a write counter of the FIFO to generate a next sequential written address for a random access memory (RAM) array of the FIFO, responsive to a write signal provided by a host process;
incrementing an empty counter of the FIFO to denote written data awaiting processing responsive to the write signal;
decrementing the empty counter responsive to a first use control signal provided by the host process, in conjunction with a sequential read of the RAM array.

11. The method of claim 10, wherein the method further comprises:
incrementing a full counter of the FIFO responsive to the same write signal, the full counter being employed to generate a full control signal denoting the RAM array being full; and
decrementing the full counter responsive to a release/reclaim control signal provided by release/reclaim control circuitry of the FIFO, which sequentially generates the release/reclaim control signal in due course for each memory location of said RAM array after the memory location has been released by the host process, which does not necessarily release sequentially read memory locations in sequential order.

12. The method of claim 11, wherein the method further comprises:
generating a release/reclaim control signal by said release/reclaim control circuitry of the FIFO for a memory location of said RAM array if the memory location is the current memory location to be sequentially considered for release/reclaim, and a control bit associated with the memory location has been set by the host process to having a predetermined relationship with a reference bit.

13. In a first in, first out storage structure (FIFO), a method comprising:
incrementing a full counter of the FIFO responsive to a write signal provided by a host process to write in sequence into a RAM array of the FIFO, the full counter being employed to generate a full control signal denoting the RAM array being full; and decrementing the full counter responsive to a release/reclaim control signal provided by release/reclaim control circuitry of the FIFO, which sequentially generates the release/reclaim control signal in due course for each memory location of said RAM array after the memory location has been released by the host process, which does not necessarily release sequentially read memory locations in sequential order.

14. The method of claim 13, wherein the method further comprises:

generating a release/reclaim control signal by said release/reclaim control circuitry of the FIFO for a memory location of said RAM array if the memory location is the current memory location to be sequentially considered for release/reclaim, and a control bit associated with the memory location has been set by the host process to having a predetermined relationship with a reference bit.

15. The method of claim 14, wherein the method further comprises:

incrementing a release/reclaim counter to point to the next memory location to be sequentially considered for release/reclaim, whenever the release/reclaim control signal is generated for the current memory location being considered, including conditionally toggling the reference bit.

16. A method for using a FIFO comprising:

asserting a write signal for the FIFO to write in sequence into a first RAM array of the FIFO; and providing a read address to the FIFO to either read in sequence data written in the first RAM array or re-read previously read data; and providing a first use signal to the FIFO to facilitate decrement by the FIFO an empty counter of the FIFO, if said read address is provided to read in sequence data written in the first RAM array of the FIFO.

17. The method of claim 16, wherein the method further comprises:

providing a done pointer, including a control bit, and a last use signal to the FIFO to write the control bit into a corresponding memory location of a second RAM array of the FIFO to release a previously read memory location of the FIFO.

18. A method for using a FIFO comprising:

asserting a write signal for the FIFO to write in sequence into a first RAM array of the FIFO;

providing a first read address to the FIFO to read in sequence data written into a first memory location of a first RAM array of the FIFO;

providing the first read address to the FIFO again to re-read the previously read data from the first memory location; and providing a done pointer, including a control bit, and a last use signal to the FIFO to write the control bit into a corresponding memory location of a second RAM array of the FIFO to release the previously read first memory location of the first RAM array for re-use.

19. An apparatus comprising:

a first in, first out storage structure (FIFO) having a random access memory (RAM) array including a plurality of memory locations, and first control circuitry coupled to the RAM array to facilitate sequential write and read accesses of said memory locations, as well as non-sequential re-read of said memory locations, including circuit elements for facilitating variably deferred release and reclaiming of sequentially read in-use ones of said memory locations; and a host process coupled to the FIFO to sequentially write into and sequentially read from the FIFO, as well as non-sequentially re-reading previously read ones of said memory locations, including provision of release addresses and control signals to the control circuitry of the FIFO to specifically release said sequentially read in-use ones of said memory locations, enabling these memory locations to be reclaimed in due course for re-use.

20. The apparatus of claim 19, wherein the apparatus is a sub-assembly including a look up engine to look up data associated with inputs, and said FIFO and host process are part of said look up engine.

21. The apparatus of claim 19, wherein the apparatus is a networking device including a forwarding section to look up data associated with addresses, and said FIFO and host process are part of said forwarding section.

22. The apparatus of claim 21, wherein the networking device is a networking device selected from a group consisting of a gateway, a router, and a switch.

23. The apparatus of claim 21, wherein said addresses are addresses selected from a group consisting of IP addresses and MAC addresses.

* * * * *